United States Patent
Matsunaga (10) Patent No.: US 10,576,722 B2
(45) Date of Patent: Mar. 3, 2020

(54) METHOD FOR BONDING, MANUFACTURING METHOD OF INK LAYER FORMED BODY, AND INK LAYER FORMED BODY

(71) Applicant: MIMAKI ENGINEERING CO., LTD., Nagano (JP)

(72) Inventor: Nobutaka Matsunaga, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/451,025

(22) Filed: Jun. 25, 2019

(65) Prior Publication Data

US 2019/0308402 A1    Oct. 10, 2019

Related U.S. Application Data

(63) Continuation of application No. 15/481,471, filed on Apr. 7, 2017, now Pat. No. 10,406,796.

(30) Foreign Application Priority Data

Apr. 8, 2016 (JP) ................................. 2016-078199
Jul. 1, 2016 (JP) ................................. 2016-131973

(51) Int. Cl.
*B32B 37/12* (2006.01)
*B32B 7/12* (2006.01)
(Continued)

(52) U.S. Cl.
CPC ............ *B32B 37/1284* (2013.01); *B32B 7/12* (2013.01); *B32B 38/145* (2013.01); *C09D 11/10* (2013.01);
(Continued)

(58) Field of Classification Search
CPC .................................................. B32B 37/1284
See application file for complete search history.

(56) References Cited

U.S. PATENT DOCUMENTS

2012/0156444 A1*  6/2012  Takemoto ................ B41M 3/12
428/195.1

FOREIGN PATENT DOCUMENTS

JP    H1158709    3/1999
JP    H11129460   5/1999
(Continued)

OTHER PUBLICATIONS

"Office Action of Japan Counterpart Application," with English translation thereof, dated Jul. 9, 2019, p. 1-p. 9.

*Primary Examiner* — Daniel H Lee
(74) *Attorney, Agent, or Firm* — JCIPRNET (57) ABSTRACT

Provided is a method for favorable bonding between an adherend and an adhesive body, which is capable of suppressing an ink layer, which is formed by an ultraviolet-curable ink, from being smudged while increasing convenience of a bonding operation between the adherend and the adhesive body, and the like. The method for bonding a medium to a foil body includes an ink layer formation process of spotting an ultraviolet-curable ink, which is ejected from an inkjet head, to a medium and irradiating ultraviolet ray to the ultraviolet-curable ink to cure the same, thereby forming an ink layer; a lamination process of laminating the medium and a foil body with the ink layer being sandwiched therebetween; and a bonding process of heating the ink layer, enabling the ink layer to function as an adhesive, and bonding the medium to the foil body.

3 Claims, 8 Drawing Sheets

(51) Int. Cl.
 B32B 38/00 (2006.01)
 C09D 11/10 (2014.01)
 C09D 11/101 (2014.01)
 C09J 5/00 (2006.01)
 B32B 38/10 (2006.01)
 B32B 37/00 (2006.01)

(52) U.S. Cl.
 CPC ............... C09D 11/101 (2013.01); C09J 5/00 (2013.01); *B32B 37/025* (2013.01); *B32B 37/1207* (2013.01); *B32B 38/10* (2013.01); *B32B 2037/1223* (2013.01); *B32B 2310/0831* (2013.01); *B32B 2429/00* (2013.01); *C09J 2205/31* (2013.01)

(56) References Cited

FOREIGN PATENT DOCUMENTS

| | | |
|---|---|---|
| JP | 2005501761 | 1/2005 |
| JP | 2005305962 | 11/2005 |

* cited by examiner

METHOD FOR BONDING, MANUFACTURING METHOD OF INK LAYER FORMED BODY, AND INK LAYER FORMED BODY

CROSS-REFERENCE TO RELATED APPLICATIONS

This application is a continuation application of and claims the priority benefit of prior application Ser. No. 15/481,471, filed on Apr. 7, 2017, now allowed. The prior application Ser. No. 15/481,471 claims the priority benefit of Japanese application serial no. 2016-078199, filed on Apr. 8, 2016, and Japanese application serial no. 2016-131973, filed on Jul. 1, 2016. The entirety of each of the above-mentioned patent application is hereby incorporated by reference herein and made a part of this specification.

BACKGROUND OF THE INVENTION

1. Technical Field

The present invention relates to a method for bonding an adherend to an adhesive body by using an ultraviolet-curable ink, a manufacturing method of an ink layer formed body and an ink layer formed body.

2. Related Art

In the related art, a method of transferring a foil to a recording medium is known (for example, Patent Document 1: JP-A-2009-226880). The method includes ejecting liquid to a recording medium, and irradiating active energy-rays to the ejected liquid to perform first curing, thereby forming an image of adhesive having adhesiveness on the recording medium. Also, the method includes transferring a foil to the formed image of adhesive and irradiating the active energy-rays from above the transferred foil to perform second curing, thereby further crosslinking the adhesive.

SUMMARY OF THE INVENTION

However, according to the method of Patent Document 1, since the liquid after the first curing becomes an adhesive having adhesiveness, it is necessary to immediately transfer the foil to the formed image of adhesive after the first curing. In other words, if the formed image of adhesive is left alone after the first curing, the adhesive becomes active and the crosslinking is likely to occur, so that it is difficult to transfer the foil to the image of adhesive. For this reason, it is difficult to perform the process of forming the adhesive and the process of transferring the foil at a time interval, so that convenience of the adhesion operation is lowered.

Also, since the liquid is kept as the adhesive having adhesiveness until the foil is transferred, the adhesive may spread on the recording medium, so that the image of adhesive may be smudged. For this reason, it is difficult to form an image with high definition after the foil is bonded.

Further, when a foil having a high shield property against the active energy-rays, for example, a gold foil or the like is used as the foil, even though the active energy-rays are irradiated from above the transferred foil, it is difficult to crosslink the adhesive, so that it is difficult to favorably perform the adhesion.

The present invention provides a method for favorable bonding an adherend to an adhesive body capable of suppressing an ink layer, which is to be formed by an ultraviolet-curable ink, from being smudged while increasing convenience of a bonding operation between the adherend and the adhesive body, and an adherend.

As an embodiment, the above features are accomplished by following configurations.

A method for bonding an adherend to an adhesive body is disclosed. The method includes an ink layer formation process of spotting an ultraviolet-curable ink, which is ejected from an inkjet head, to any one of the adherend and the adhesive body and irradiating ultraviolet ray to the ultraviolet-curable ink to cure the same, thereby forming an ink layer, a lamination process of laminating the adherend and the adhesive body with the ink layer being sandwiched therebetween, and a bonding process of heating the ink layer, enabling the ink layer to function as an adhesive, and bonding the adherend to the adhesive body.

According to the disclosed configuration, it is possible to cure the ultraviolet-curable ink in the ink layer formation process. At this time, since the ultraviolet-curable ink has been cured, it does not function as an adhesive and the ink layer can be treated as it is cured. For this reason, it is possible to perform the ink layer formation process and the bonding process at a time interval, so that it is possible to increase the convenience of the adhesion operation between the adherend and the adhesive body. Also, in the ink layer formation process, it is possible to immediately cure the ink layer by irradiating the ultraviolet ray to the ultraviolet-curable ink, so that it is possible to suppress the ink layer from being spread and smudged. Also, at a state where the adherend and the adhesive body are laminated with the ink layer being sandwiched therebetween, it is possible to soften the ink layer and to enable the softened ink layer to function as an adhesive by heating the ink layer, so that it is possible to favorably bond the adherend and the adhesive body. For this reason, it is possible to suppress the ink layer, which is to be formed by the ultraviolet-curable ink, from being smudged, so that it is possible to make the adhesive body bonded to the adherend with high definition. Meanwhile, in the bonding process, the ink layer is heated with being pressed via the adhesive body so that the ink layer is flat. Thereby, it is possible to improve brightness of the adhesive body bonded to the adherend.

Also, preferably, the ink layer is formed by the ultraviolet-curable ink, which is to be melted by heat after being cured, and is melted by heating and functions as an adhesive.

According to the disclosed configuration, the ink layer is melted and softened by heating, so that the ink layer is able to favorably function as an adhesive. In the meantime, as the ultraviolet-curable ink, "PR-100" or "LUS-350 Clear" available from MIMAKI ENGINEERING CO., LTD. can be used, for example.

Also, preferably, in the ink layer formation process, the ink layer is formed on the adherend, and in the lamination process, the adhesive body attached to a release sheet is contacted to the ink layer.

According to the disclosed configuration, since it is possible to form the adherend with the ink layer with high definition by an inkjet head, it is possible to make the adhesive body bonded to the adherend by the ink layer with high definition.

Also, preferably, in the ink layer formation process, the ink layer is formed on the adhesive body attached to the release sheet, and in the lamination process, the ink layer formed on the adhesive body is contacted to the adherend.

According to the disclosed configuration, it is possible to form the ink layer on the adhesive body. For this reason, even when the adherend is an adherend having a shape for which it is difficult to form the ink layer by the inkjet head, such as an adherend having a curved surface, an adherend having a deep bottom surface, and the like, it is possible to accomplish the favorable bonding between the adhesive body and the adherend by bonding the adhesive body having the ink layer formed thereon to the adherend.

Also, in the ink layer formation process, an overlap printing of overlappingly spotting the ultraviolet-curable ink to the same spotting position more than once, to which the ultraviolet-curable ink is to be spotted, is preferably performed.

According to the disclosed configuration, the ultraviolet-curable ink is ejected from the inkjet head to the same spotting position more than once, so that it is possible to make a dot diameter of the spotted ultraviolet-curable ink greater, as compared to a configuration (i.e., the spotting is performed only once) where the overlap printing is not performed. Thereby, since it is possible to suppress a pinhole from being formed in the ink layer, it is possible to suppress a bonding defect of the adherend that is to adhere to the ink layer, so that it is possible to improve a quality of the adherend.

Also, in the ink layer formation process, when performing the overlap printing, an ink amount of the ultraviolet-curable ink is preferably less than when the overlap printing is not performed.

According to the disclosed configuration, it is possible to form a thin ink layer. For this reason, even when a force resulting from scratch or the like is applied to the ink layer via the adherend, it is possible to reduce displacement of the ink layer, so that it is possible to reduce displacement of the adherend and to thus suppress the adherend from being peeled off. Therefore, it is possible to improve a scratch resistance of the adherend.

Also, in the ink layer formation process, when performing the overlap printing, the ink amount of the ultraviolet-curable ink is preferably set to be the same each time.

According to the disclosed configuration, since it is possible to perform the overlap printing by ejecting the same ink amount from the inkjet head, it is not necessary to adjust the ink amount each ejection. In the meantime, as a condition of the overlap printing, a condition that the ultraviolet-curable ink is to be overlappingly spotted twice to the same spotting position with a 50% ink amount of a usual ink amount is preferable.

Also, in the ink layer formation process, preferably, after the ultraviolet-curable ink is spotted, the spotted ultraviolet-curable ink is semi-cured by irradiating the ultraviolet ray thereto, thereby forming the ink layer, and then the ink layer is completely cured by irradiating the ultraviolet ray thereto.

According to the disclosed configuration, it is possible to suppress the ultraviolet-curable ink from being smudged by semi-curing the ultraviolet-curable ink. Also, for a time period after the ultraviolet-curable ink is semi-cured until it is completely cured, an edge portion (a boundary portion between the ultraviolet-curable ink and the spotted adherend or adhesive body) of the ultraviolet-curable ink spotted to the spotting position becomes gentle (tapered). For this reason, even when the completely cured ink layer is applied with the force resulting from the scratch or the like via the adherend, it is possible to suppress the adherend from being caught on the ink layer, so that it is possible to improve the scratch resistance of the adherend. In the meantime, the ink layer formation process is also referred to as a gloss tone printing. Also, in the ink layer formation process, the ultraviolet-curable ink is semi-cured by irradiating the ultraviolet ray thereto with a delay of predetermined time (for example, several seconds) after spotting the ultraviolet-curable ink.

Also, preferably, the ultraviolet-curable ink has a glass transition temperature that is 25° C. or higher and is lower than a heating temperature in the bonding process.

According to the disclosed configuration, since the glass transition temperature of the ultraviolet-curable ink is lower than the heating temperature, it is possible to favorably soften the ultraviolet-curable ink by the heating, so that it is possible to enable the ink layer to appropriately function as an adhesive. Also, since the glass transition temperature of the ultraviolet-curable ink is 25° C. or higher, it is possible to favorably keep the cured state of the ultraviolet-curable ink at a state lower than 25° C., for example, at a room-temperature state, so that it is possible to improve the scratch resistance. In the meantime, the glass transition temperature is 25° C. or higher, preferably 40° C. or higher, and more preferably 60° C. or higher. In this case, even when heat is applied to the ink layer from an outside, for example, it is possible to favorably keep the cured state of the ultraviolet-curable ink. For example, when the ink layer is formed on a cover of a portable terminal, even though the ink layer is heated by heat radiation from the portable terminal, it is possible to favorably keep the cured state of the ultraviolet-curable ink. In the meantime, as the ultraviolet-curable ink, "LUS-350 Clear" available from MIMAKI ENGINEERING CO., LTD. can be used, for example. This ink is used, so that it is possible to set the heating temperature to about 120° C. in the bonding process.

Another method for bonding an adherend to an adhesive body is disclosed. The method includes an ink layer formation process of spotting an ultraviolet-curable ink, which is ejected from an inkjet head, to any one of the adherend and the adhesive body and irradiating ultraviolet ray to the ultraviolet-curable ink to cure the same, thereby forming an ink layer, a solvent applying process of applying a solvent to the ink layer and enabling the ink layer to function as an adhesive, a lamination process of laminating the adherend and the adhesive body with the ink layer being sandwiched therebetween, and a bonding process of bonding the adherend and the adhesive body.

According to the disclosed configuration, it is possible to cure the ultraviolet-curable ink in the ink layer formation process. At this time, since the ultraviolet-curable ink has been cured, it does not function as an adhesive and the ink layer can be treated as it is cured. For this reason, it is possible to perform the ink layer formation process and the bonding process at a time interval, so that it is possible to increase the convenience of the adhesion operation between the adherend and the adhesive body. Also, in the ink layer formation process, it is possible to immediately cure the ink layer by irradiating the ultraviolet ray to the ultraviolet-curable ink, so that it is possible to suppress the ink layer from being spread and smudged. Also, the ink layer is dissolved by applying the solvent to the ink layer, the dissolved ink layer is able to function as an adhesive and the adherend and the adhesive body are laminated with the ink layer being sandwiched therebetween, so that it is possible to favorably bond the adherend and the adhesive body. For this reason, it is possible to suppress the ink layer, which is to be formed by the ultraviolet-curable ink, from being smudged, so that it is possible to make the adhesive body bonded to the adherend with high definition. Meanwhile, since it is not necessary to heat the ink layer, it is possible to accomplish the favorable bonding between the adherend and the adhesive body without using a heating device.

Also, preferably, the ink layer is formed of the ultraviolet-curable ink which exhibits a low solvent resistance after being cured, and when being applied with a solvent, the ink layer is dissolved therein and abled to function as an adhesive.

According to the disclosed configuration, the ink layer is dissolved by applying the solvent thereto, so that it is possible to enable the ink layer to function as an adhesive. In the meantime, as the ultraviolet-curable ink, "LUS-350 Clear" available from MIMAKI ENGINEERING CO., LTD. can be used, for example.

Also, the ultraviolet-curable ink preferably includes a thermoplastic resin.

According to the disclosed configuration, since the ultraviolet-curable ink includes the thermoplastic resin, it is possible to favorably dissolve the ink layer by the solvent and to enable the ink layer to appropriately function as an adhesive.

A manufacturing method of an ink layer formed body is disclosed. The method includes ejecting an ultraviolet-curable ink, which is able to function as an adhesive upon being heated, from an inkjet head, spotting the ultraviolet-curable ink to a base body, and irradiating ultraviolet ray to the ultraviolet-curable ink to cure the same, thereby forming an ink layer on the base body.

Also, an ink layer formed body is disclosed. The ink layer formed body has an ink layer, which is obtained by curing an ultraviolet-curable ink and is capable of functioning as an adhesive upon being heated, formed on a base body.

According to the disclosed configuration, since the ultraviolet-curable ink has been cured, it does not function as an adhesive. For this reason, it is possible to easily treat the ink layer formed body of which the ink layer has been cured, thereby increasing the convenience thereof. Also, the ink layer can easily have a function as an adhesive by heating the ink layer. In the meantime, as the base body, an adherend to which an adhesive body is to adhere or an adhesive body that is to adhere to an adherend can be used.

Another manufacturing method of an ink layer formed body is disclosed. The method includes ejecting an ultraviolet-curable ink, which is capable of functioning as an adhesive by applying a solvent thereto, from an inkjet head, spotting the ultraviolet-curable ink to a base body, and irradiating ultraviolet ray to the ultraviolet-curable ink to cure the same, thereby forming an ink layer on the base body.

Also, an ink layer formed body is disclosed. The ink layer formed body has an ink layer, which is obtained by curing an ultraviolet-curable ink, which is capable of functioning as an adhesive by applying a solvent thereto, on a base body.

According to the disclosed configuration, since the ultraviolet-curable ink has been cured, it does not function as an adhesive. For this reason, it is possible to easily treat the ink layer formed body of which the ink layer has been cured, thereby increasing the convenience thereof. Also, the ink layer can easily have a function as an adhesive by applying the solvent thereto. In the meantime, as the base body, an adherend to which an adhesive body is to adhere or an adhesive body that is to adhere to an adherend can be used.

DETAILED DESCRIPTION OF PREFERRED EMBODIMENTS

Hereinafter, embodiments of the present invention will be described in detail with reference to the drawings. In the meantime, the present invention is not limited to the embodiments. Also, the constitutional elements of the embodiments to be described later include elements that can be easily replaced by one skilled in the art or the substantially same elements. Also, the constitutional elements to be described later can be appropriately combined, and the respective embodiments can also be combined.

First Illustrative Embodiment

A method for adhesion of a first embodiment is a method for bonding between a medium 5, which is an adherend, and a foil body 11, which is an adhesive body, with an ink layer 8 being interposed therebetween. First, a bonded body 1 that is to be manufactured by the method for adhesion is described with reference to FIG. 1.

Figure 1:
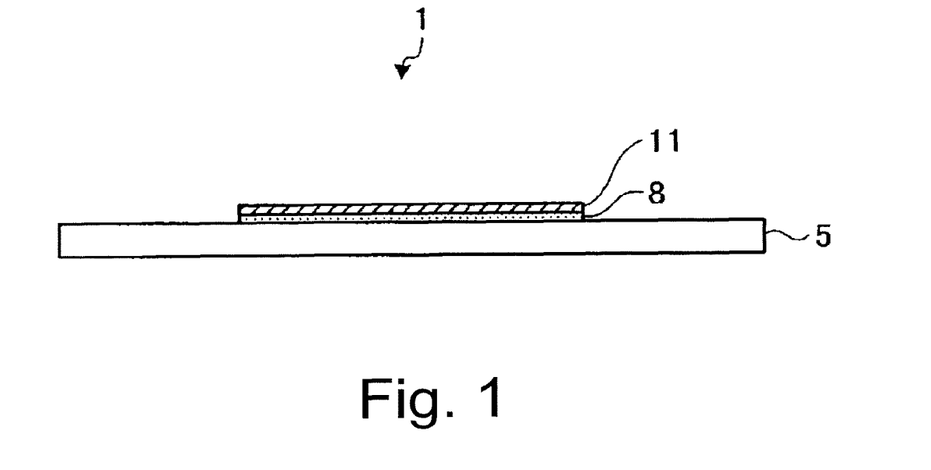
FIG. 1 is a sectional view depicting a bonded body obtained by a method for adhesion in accordance with a first embodiment.

FIG. 1 is a sectional view depicting a bonded body obtained by the method for adhesion in accordance with the first embodiment. As shown in FIG. 1, the bonded body 1 includes the medium 5, the foil body 11 and the ink layer 8.

As a material of the medium 5, a resin, metal, fabric, leather or the like can be applied, and any material can be applied inasmuch as it is bondable. Also, the medium 5 has an adherend surface to which the foil body 11 is to adhere. A shape of the adherend surface may be a planar surface or a curved surface, and any shape can be applied inasmuch as it is a bondable shape.

The ink layer 8 is formed using an ultraviolet-curable ink. The ink layer 8 is formed on the adherend surface of the medium 5 with rising from the adherend surface. The ultraviolet-curable ink used for the ink layer 8 is an ink that is to be completely cured by irradiating ultraviolet ray thereto, and is an ink that is to be melted and softened by heating at a completely cured state and is thus to function as an adhesive. In the meantime, the complete curing indicates a crosslinked state obtained by irradiating the ultraviolet ray to the ultraviolet-curable ink. As the ultraviolet-curable ink, "PR-100" or "LUS-350 Clear" available from MIMAKI ENGINEERING CO., LTD. is used, for example.

The foil body 11 is a vapor-deposited film formed by using metal or the like, for example, and is formed as a decorative layer for decorating the medium 5.

In the bonded body 1 configured as described above, the ink layer 8 is formed with rising from the adherend surface of the medium 5, so that the decorative foil body 11 to adhere to the medium 5 via the ink layer 8 is formed with rising.

Figure 2:
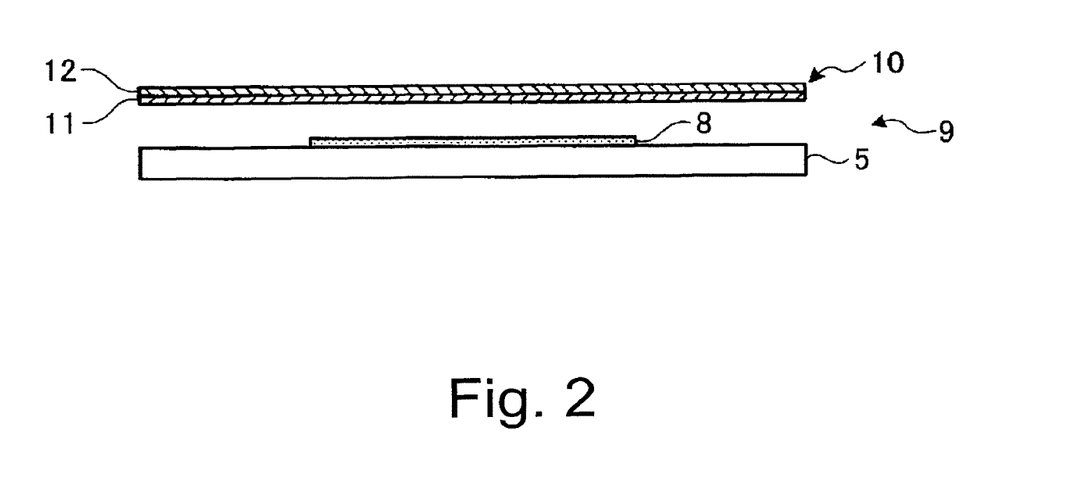
FIG. 2 is a sectional view depicting an ink layer formed body and a vapor-deposited film, which are used for the method for adhesion in accordance with the first embodiment.

Subsequently, an ink layer formed body 9 and a vapor-deposited film 10, which are used for the method for bonding the medium 5 to the foil body 11 of the bonded body 1 shown in FIG. 1, are described with reference to FIG. 2. FIG. 2 is a sectional view depicting an ink layer formed body and a vapor-deposited film, which are used for the method for adhesion in accordance with the first embodiment.

As shown in FIG. 2, the ink layer formed body 9 has the medium (adherend) 5, which is a base body, and the ink layer 8. In the ink layer formed body 9, the ink layer 8 is formed on the medium 5 by spotting an ultraviolet-curable ink from an inkjet head to the medium 5, and irradiating ultraviolet ray to the ultraviolet-curable ink to completely cure the same. Before adhesion with the vapor-deposited film 10, since the ink layer 8 is at the completely cured state and does not function as an adhesive, the ink layer formed body 9 can be easily treated. That is, the ink layer formed body 9 can be preserved with the ink layer 8 being completely cured.

The vapor-deposited film 10 has a release film (release sheet) 12 and the foil body 11, which is a vapor-deposited film. The foil body 11, which is to adhere to the ink layer 8, is attached to the release film 12 so that it can be peeled off. That is, an attachment force between the release film 12 and the foil body 11 is lower than an adhesive force between the foil body 11 and the ink layer 8. For this reason, at a state where the foil body 11 of the vapor-deposited film 10 adheres to the ink layer 8, when the vapor-deposited film 10 is peeled off, the foil body 11 adhering to the ink layer 8 is peeled off from the release film 12. On the other hand, the foil body 11 that does not adhere to the ink layer 8 is kept with being attached to the release film 12.

Figure 3:
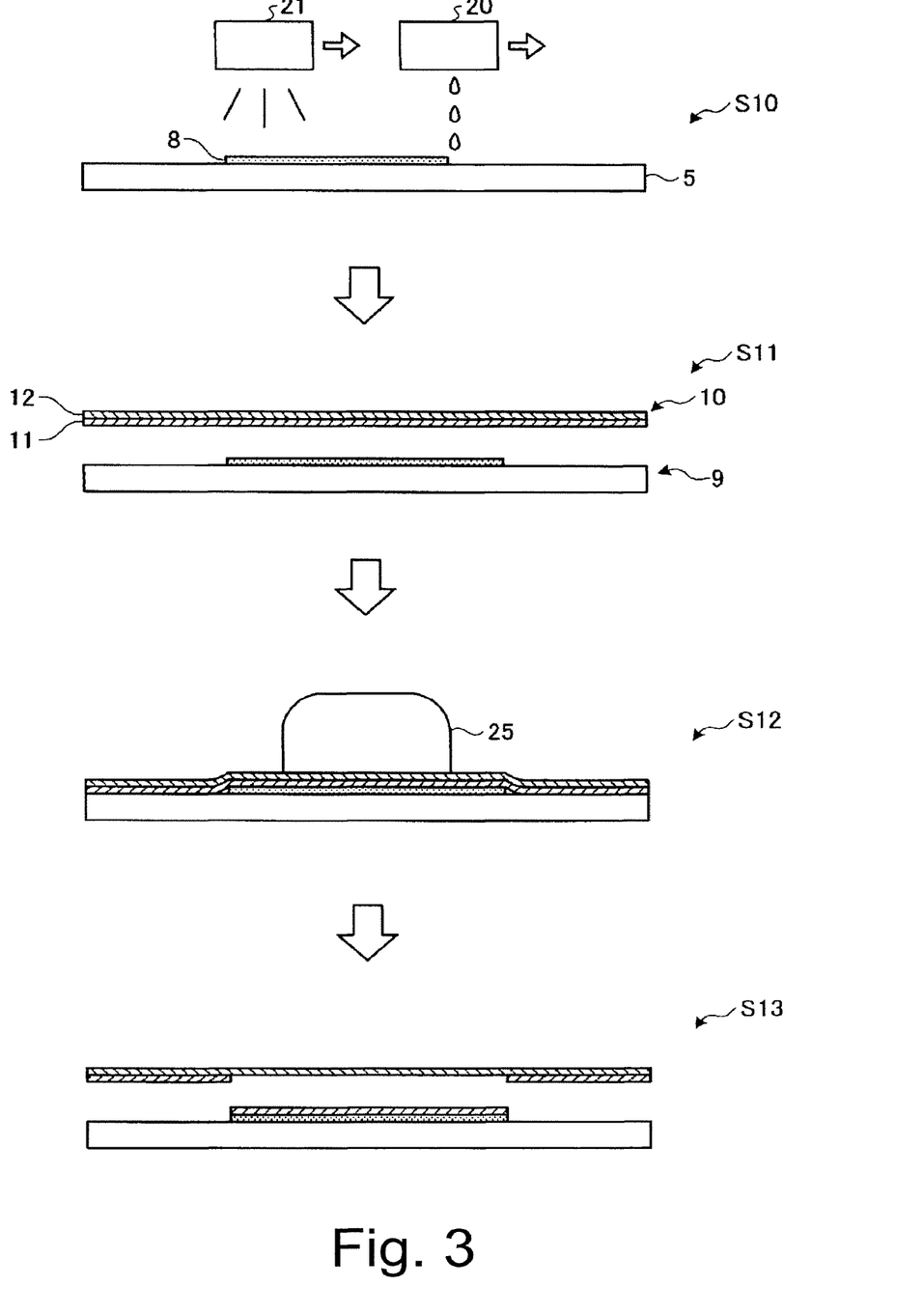
FIG. 3 illustrates the method for adhesion in accordance with the first embodiment.

Subsequently, a method for adhesion of the medium 5 and the foil body 11 in accordance with the first embodiment is described with reference to FIG. 3. FIG. 3 illustrates the method for adhesion of the first embodiment. As shown in FIG. 3, according to the method for adhesion of the first embodiment, an ink layer formation process S10, a lamination process S11, a bonding process S12 and a release process S13 are sequentially performed.

As shown in FIG. 3, in the ink layer formation process S10, the ultraviolet-curable ink is ejected from an inkjet head 20 and the ejected ultraviolet-curable ink is spotted to the medium 5. In the ink layer formation process S10, a printing operation is performed using "UJF-3042" or "UJF-6042" available from MIMAKI ENGINEERING CO., LTD., as a printing device having the inkjet head 20, for example. Also, in the ink layer formation process S10, an ultraviolet irradiation device 21 is moved, following a moving direction of the inkjet head 20, and ultraviolet ray is irradiated from the ultraviolet irradiation device 21 to the ultraviolet-curable ink, so that the ultraviolet-curable ink is cured to form the ink layer 8. In this way, in the ink layer formation process S10, after the ultraviolet-curable ink is ejected, it is cured by irradiating the ultraviolet ray thereto. Therefore, it is possible to form an image of the inkjet-printed ink layer 8 with high definition. Also, in the ink layer formation process S10, it is possible to form the ink layer 8 with rising from the adherend surface of the medium 5. Also, in the ink layer formation process S10, the medium 5 having the ink layer 8 formed thereon is treated as the ink layer formed body 9.

Like this, the ink layer formation process S10 is a manufacturing method of the ink layer formed body 9 shown in FIG. 2, and the ink layer formed body 9 of which the ink layer 8 has been completely cured is preserved as it is, or is treated in the lamination process S11, which will be described later.

Subsequently, in the lamination process S11, the ink layer 8 of the ink layer formed body 9 and the foil body 11 of the vapor-deposited film 10 are overlapped with facing each other, so that the medium 5 and the foil body 11 are laminated with the ink layer 8 being sandwiched therebetween.

In the bonding process S12, the ink layer 8 is heated and melted from an outer side (the release film 12-side) of the vapor-deposited film 10 by a heating member 25, so that the ink layer 8 is able to function as an adhesive and the medium 5 and the foil body 11 are bonded to each other by the ink layer 8. Specifically, in the bonding process S12, when heating the ink layer 8, the heating member 25 is pressed to the medium 5 via the vapor-deposited film 10 and the ink layer 8, so that the medium 5 and the foil body 11 are compression-bonded. At this time, in the bonding process S12, the heating member 25 is pressed towards the medium 5 so that the ink layer 8 is flat. Since the foil body 11 adheres to the ink layer 8 that becomes flat, it is possible to increase brightness of the foil body 11.

In the meantime, the heating member 25 that is to be used in the bonding process S12 may be a heating member such as an iron having a flat heating surface or a cylindrical heating roller of which an outer peripheral surface is to be heated. That is, the heating member is not particularly limited. Also, in the bonding process S12, the vapor-deposited film 10 is pressed to the medium 5. However, the medium 5 may be pressed to the vapor-deposited film 10. That is, the pressing target is not particularly limited. Also, in the bonding process S12, any method capable of compression-bonding the medium 5 and the foil body 11 can be used. For example, the medium 5 and the foil body 11 may be accommodated in a vacuum pack, the vacuum pack may be vacuumed and the medium 5 and the foil body 11 may be compression-bonded by an atmospheric pressure.

Subsequently, in the release process S13, the vapor-deposited film 10 is peeled off from the medium 5. In the vapor-deposited film 10, the foil body 11 bonded to the ink layer 8 is peeled off from the release film 12, and the foil body 11 not bonded to the ink layer 8 is kept with being attached to the release film 12. In this way, the bonded body 1 shown in FIG. 1 is formed by the method for adhesion shown in FIG. 3.

As described above, according to the first embodiment, it is possible to cure the ultraviolet-curable ink in the ink layer formation process S10. At this time, since the ultraviolet-curable ink has been cured, it does not function as an adhesive and the ink layer 8 can be treated as it is cured. For this reason, it is possible to perform the ink layer formation process S10 and the bonding process S12 at a time interval, so that it is possible to increase the convenience of the adhesion operation between the medium 5 and the foil body 11. Also, in the ink layer formation process S10, since it is possible to immediately cure the ink layer 8 by irradiating the ultraviolet ray to the ultraviolet-curable ink, it is possible to suppress the ink layer 8 from being spread and smudged. At the state where the medium 5 and the foil body 11 are laminated with the ink layer 8 being sandwiched therebetween, the ink layer 8 is able to function as an adhesive by heating the ink layer 8, so that it is possible to accomplish the favorable bonding between the medium 5 and the foil body 11. For this reason, it is possible to suppress the ink layer 8 formed of the ultraviolet-curable ink from being smudged, so that it is possible to make the foil body 11 bonded to the medium 5 with high definition.

Also, according to the first embodiment, since it is possible to form the ink layer 8 on the medium 5 with high definition by the inkjet head 20, it is possible to make the foil body 11 bonded to the medium 5 by the ink layer 8 with high definition.

Meanwhile, in the first embodiment, the vapor-deposited film 10 of which the foil body 11 is attached to the release film 12 is used. However, instead of the release film 12, a silicone sheet having high thermal conductivity can also be used. By using the silicone sheet having high thermal conductivity, it is possible to favorably heat the ink layer 8 by the heating member 25.

Also, in the first embodiment, the foil body 11 is bonded for decorating the medium 5. However, the foil body 11 may be bonded to the medium 5 so as to form a circuit pattern on the medium 5. That is, a circuit board having a circuit pattern formed thereon may also be formed by applying a circuit board as the medium 5, applying a high conductive member as the foil body 11 and forming an image of a circuit pattern as the ink layer 8.

Also, in the first embodiment, the ink layer 8 may be formed so that lines of an image of the ink layer 8 to be formed in the ink layer formation process S10 are to be fine, considering squashing of the ink layer 8 due to the compression bonding between the medium 5 and the foil body 11 in the bonding process S12.

Figure 4:
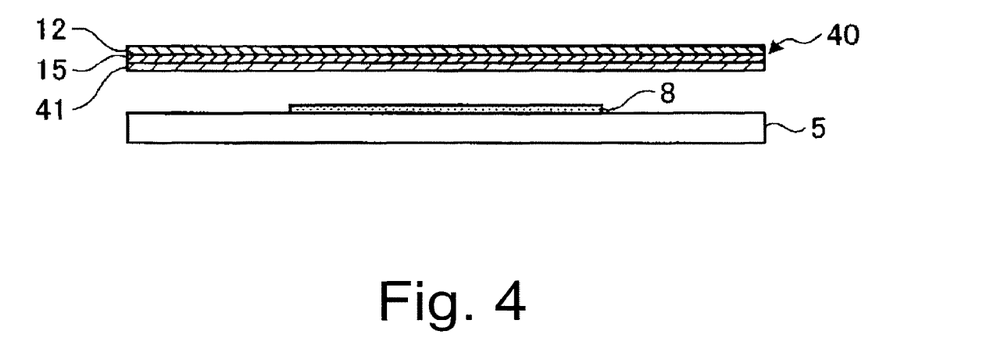
FIG. 4 is a sectional view depicting another example of an adhesive body in accordance with the first embodiment.

Also, in the first embodiment, the vapor-deposited film is applied as the foil body 11. However, a gold foil 41 may also be applied as the foil body 11. Herein, when applying the gold foil 41, a gold foil film 40 shown in FIG. 4 may be applied, instead of the vapor-deposited film 10. FIG. 4 is a sectional view depicting another example of the adhesive body in accordance with the first embodiment.

Specifically, when the gold foil 41 is used as the foil body 11, if the gold foil 41 is bonded to the ink layer 8, as it is, it is troublesome to collect and treat the gold foil 41 that has not been bonded to the ink layer 8. For this reason, the release film 12 is provided with a low adhesive layer 15 and the gold foil 41 is bonded to the low adhesive layer 15, so that the gold foil film 40 is formed. At this time, an adhesive force between the low adhesive layer 15 and the gold foil 41 is lower than an adhesive force between the gold foil 41 and the ink layer 8. By using the gold foil film 40, it is possible to favorably bond the gold foil 41 to the ink layer 8 and to keep the gold foil 41, which is not to adhere to the ink layer 8, with being attached to the release film 12, so that it is possible to easily collect and treat the gold foil 41.

Figure 5:
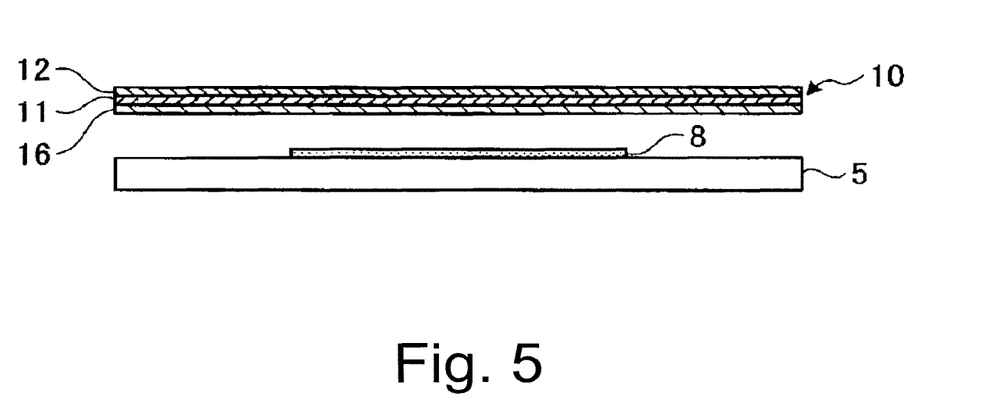
FIG. 5 is a sectional view depicting another example of the adhesive body in accordance with the first embodiment.

Also, in the first embodiment, the vapor-deposited film 10 having the foil body 11 and the release film 12 is applied. However, as shown in FIG. 5, the foil body 11 may be further provided with an adhesive layer 16 having an anchoring effect of improving the adhesiveness with the ink layer 8. FIG. 5 is a sectional view depicting another example of the adhesive body in accordance with the first embodiment.

Specifically, the vapor-deposited film 10 of FIG. 5 has an adhesive layer 16, which is provided at an opposite side to the release film 12 with the foil body 11 being sandwiched therebetween. The adhesive layer 16 is formed using an adhesive wax, for example. A temperature at which the adhesive layer 16 functions as an adhesive is set higher than the melting temperature of the ink layer 8 that is to be melted by the heating member 25 in the bonding process S12. That is, when the ink layer 8 is heated by the heating member 25 in the bonding process S12, the ink layer 8 functions as an adhesive and a part of the adhesive layer 16 slightly functions as an adhesive or the adhesive layer 16 does not function as an adhesive. For this reason, in the bonding process S12, while the adhesive layer 16 and the ink layer 8 adhere to each other more firmly, the bonding between the adhesive layer 16 and the medium 5 is suppressed. From the above, it is possible to accomplish the firmer bonding between the medium 5 and the foil body 11 by using the vapor-deposited film 10 shown in FIG. 5.

Second Illustrative Embodiment

Figure 6:
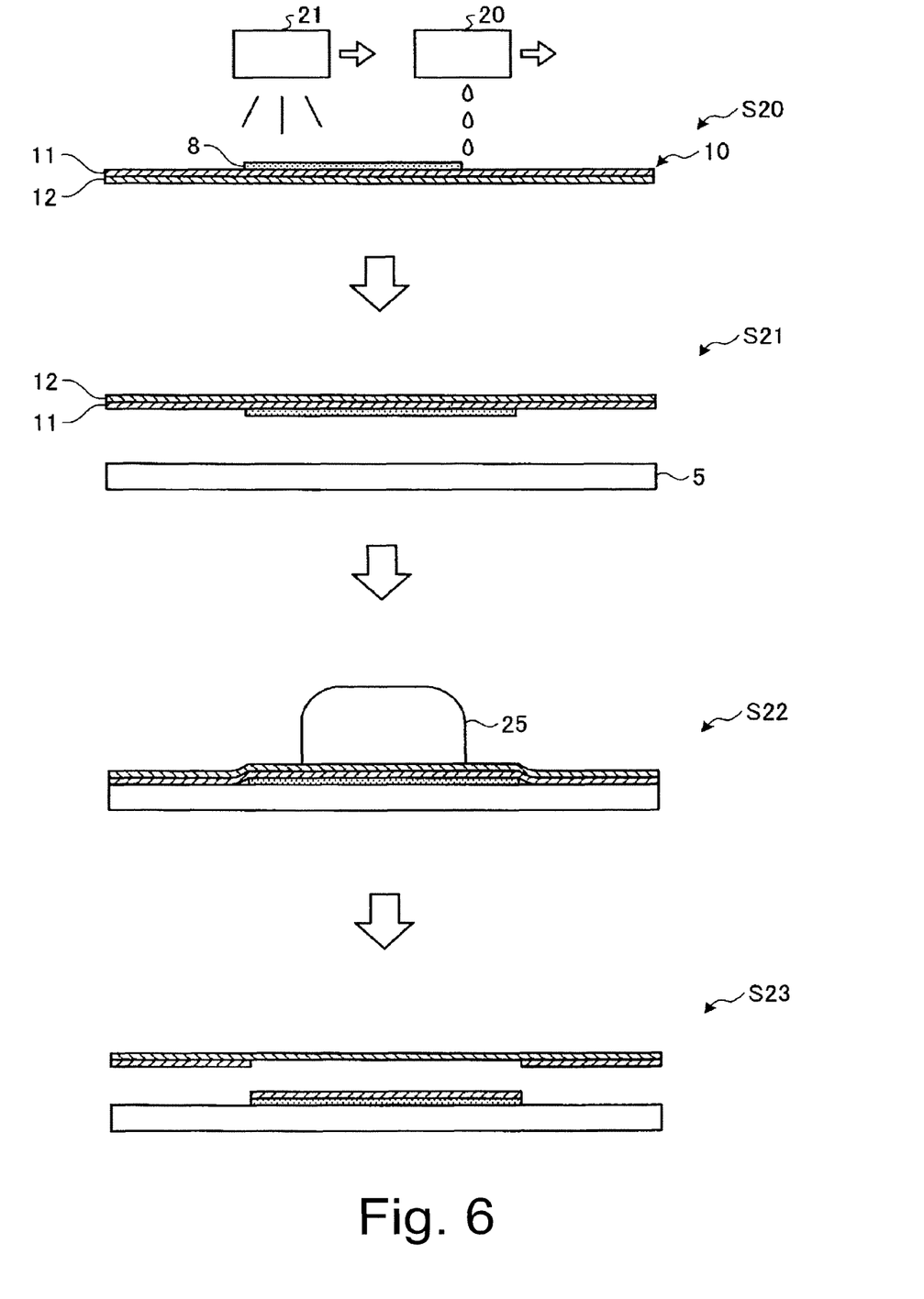
FIG. 6 illustrates a method for adhesion in accordance with a second embodiment.

Subsequently, a method for adhesion in accordance with a second embodiment is described with reference to FIG. 6. Meanwhile, in the second embodiment, parts different from the first embodiment are described so as to avoid the overlapping descriptions, and the same configurations as the first embodiment are denoted with the same reference numerals. FIG. 6 illustrates the method for adhesion of the second embodiment.

In the method for adhesion of the second embodiment, the ink layer 8 is formed on the vapor-deposited film 10. As shown in FIG. 6, in the method for adhesion of the second embodiment, an ink layer formation process S20, a lamination process S21, a bonding process S22, and a release process S23 are sequentially performed.

As shown in FIG. 6, in the ink layer formation process S20, the ultraviolet-curable ink is ejected from the inkjet head 20 and the ejected ultraviolet-curable ink is spotted to the foil body of the vapor-deposited film 10. Also, in the ink layer formation process S20, like the ink layer formation process S10 of the first embodiment, the ultraviolet irradiation device 21 is moved, following the moving direction of the inkjet head 20, and the ultraviolet ray is irradiated from the ultraviolet irradiation device 21 to the ultraviolet-curable ink, so that the ultraviolet-curable ink is cured to form the ink layer 8. In the ink layer formation process S20, the vapor-deposited film 10 having the ink layer 8 formed thereon is treated as the ink layer formed body 9.

Like this, the ink layer formation process S20 is a manufacturing method of the ink layer formed body 9 shown in FIG. 6, like the ink layer formation process S10 of the first embodiment, and the foil body 11 becoming an adhesive body is applied as a base material that is used for the ink layer formed body 9. In the meantime, the ink layer formed body 9 is also preserved as it is, or is treated in the lamination process S21, which will be described later.

In the lamination process S21, the ink layer 8 formed on the vapor-deposited film 10 and the medium 5 are overlapped with facing each other, so that the medium 5 and the foil body 11 are laminated with the ink layer 8 being sandwiched therebetween.

Subsequently, the bonding process S22 and the release process S23 are sequentially performed. In the meantime, since the bonding process S22 and the release process S23 are the same as the bonding process S12 and the release process S13 of the first embodiment, the descriptions thereof are omitted.

As described above, according to the second embodiment, it is possible to form the ink layer 8 on the foil body 11 of the vapor-deposited film 10. For this reason, even when the medium 5 is an adherend having a shape for which it is difficult to form the ink layer 8 by the inkjet head 20, such as an adherend having a curved surface, an adherend having a deep bottom surface, and the like, it is possible to accomplish the favorable bonding between the medium 5 and the foil body 11 by bonding the vapor-deposited film 10 having the ink layer 8 formed thereon to the medium 5.

Third Illustrative Embodiment

Figure 7:
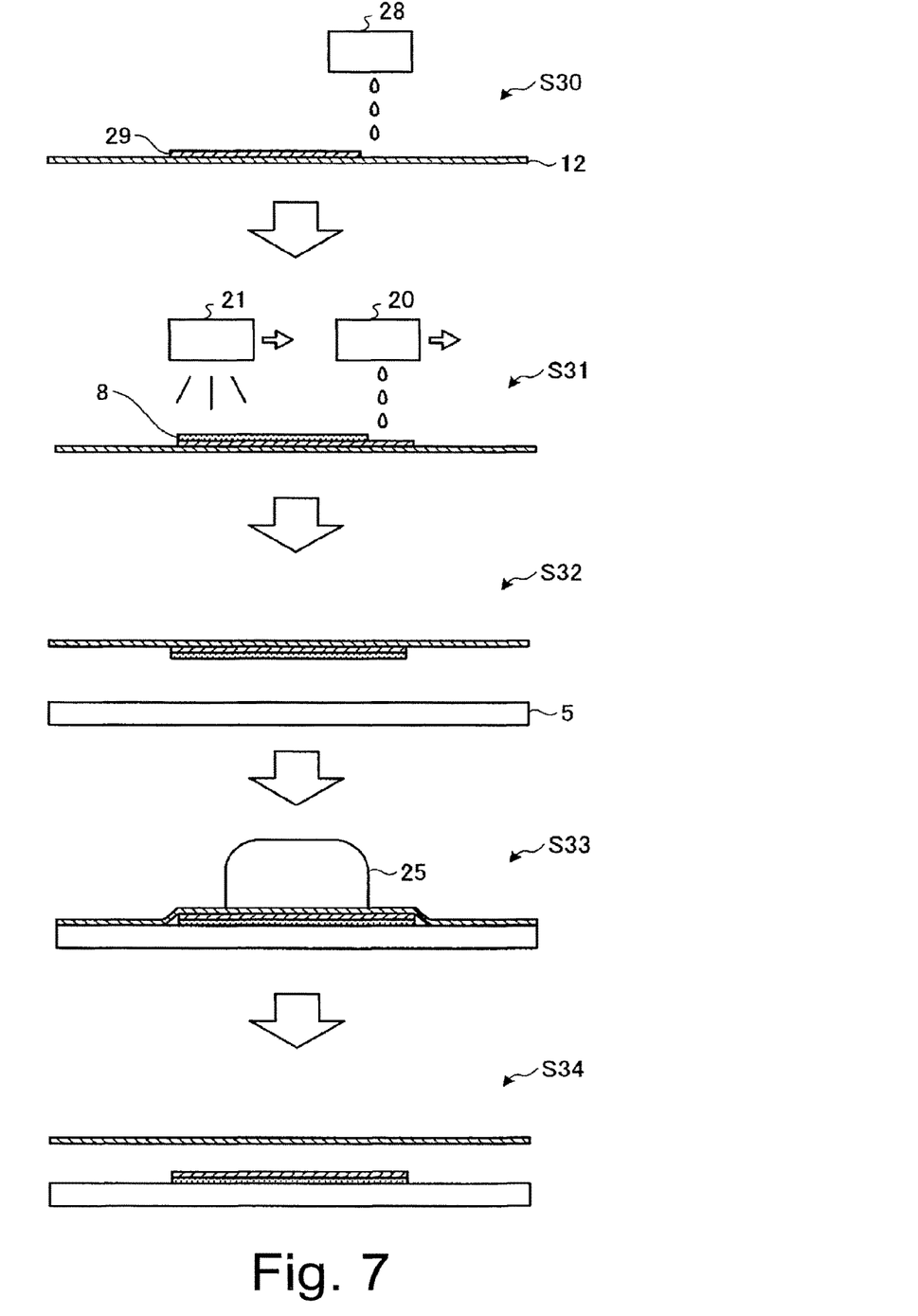
FIG. 7 illustrates a method for adhesion in accordance with a third embodiment.

Subsequently, a method for adhesion in accordance with a third embodiment is described with reference to FIG. 7. Meanwhile, in the third embodiment, parts different from the first and second embodiments are described so as to avoid the overlapping descriptions, and the same configurations as the first and second embodiments are denoted with the same reference numerals. FIG. 7 illustrates the method for adhesion of the third embodiment.

In the method for adhesion of the third embodiment, a process ink layer 29 is provided, instead of the foil body 11 of the vapor-deposited film 10 of the second embodiment. As shown in FIG. 7, in the method for adhesion of the third embodiment, a process ink layer formation process S30, an ink layer formation process S31, a lamination process S32, a bonding process S33 and a release process S34 are sequentially performed.

As shown in FIG. 7, in the process ink layer formation process S30, a process ink is ejected from the inkjet head 20 and the ejected process ink is spotted to the release film 12. Thereby, in the process ink layer formation process S30, a process ink layer 29 is formed (printed) as a color image on the release film 12.

In the ink layer formation process S31, the ultraviolet-curable ink is ejected from the inkjet head 20 and the ejected ultraviolet-curable ink is spotted to the process ink layer 29 formed on the release film 12. Also, in the ink layer formation process S31, like the ink layer formation process S10 of the first embodiment, the ultraviolet irradiation device 21 is moved, following the moving direction of the inkjet head 20, and the ultraviolet ray is irradiated from the ultraviolet irradiation device 21 to the ultraviolet-curable ink, so that the ultraviolet-curable ink is cured to form the ink layer 8. At this time, the process ink layer 29 and the ink layer 8 are formed to be the same image, and the process ink layer 29 and the ink layer 8 becoming the same image are formed with being overlapped to be located at the same position. In the meantime, a color film consisting of the process ink layer 29, the ink layer 8 and the release film 12 is treated as the ink layer formed body 9.

In the lamination process S32, the ink layer 8 formed on the color film and the medium 5 are overlapped with facing each other, so that the medium 5 and the process ink layer 29 are laminated with the ink layer 8 being sandwiched therebetween.

Subsequently, the bonding process S33 and the release process S34 are sequentially performed. In the meantime, since the bonding process S33 and the release process S34 are the same as the bonding process S12 and the release process S13 of the first embodiment, except that the foil body 11 is replaced with the process ink layer 29, the descriptions thereof are omitted.

As described above, according to the third embodiment, it is possible to favorably bond the process ink layer 29, instead of the foil body 11, to the medium 5 with the ink layer 8 being interposed therebetween.

Meanwhile, according to the third embodiment, in the process ink layer formation process S30, the process ink layer 29 is formed on the release film 12. However, an overcoat layer formation process may be performed before the process ink layer formation process S30. Specifically, in the overcoat layer formation process, an overcoat ink is ejected from the inkjet head 28, and the ejected overcoat ink is spotted to the release film 12. Thereby, in the overcoat layer formation process, the release film 12 is formed with an overcoat layer for protecting the process ink layer 29. Thereafter, in the process ink layer formation process S30, the process ink is ejected from the inkjet head 28, and the ejected process ink is spotted to the overcoat layer formed on the release film 12. In the meantime, the overcoat layer is formed with being overlapped to be located at the same position, like the process ink layer 29 and the ink layer 8. According to this configuration, since it is possible to form the overcoat layer on a surface of the process ink layer 29, it is possible to protect the process ink layer 29, so that it is possible to increase the scratch resistance.

Fourth Illustrative Embodiment

Figure 8:
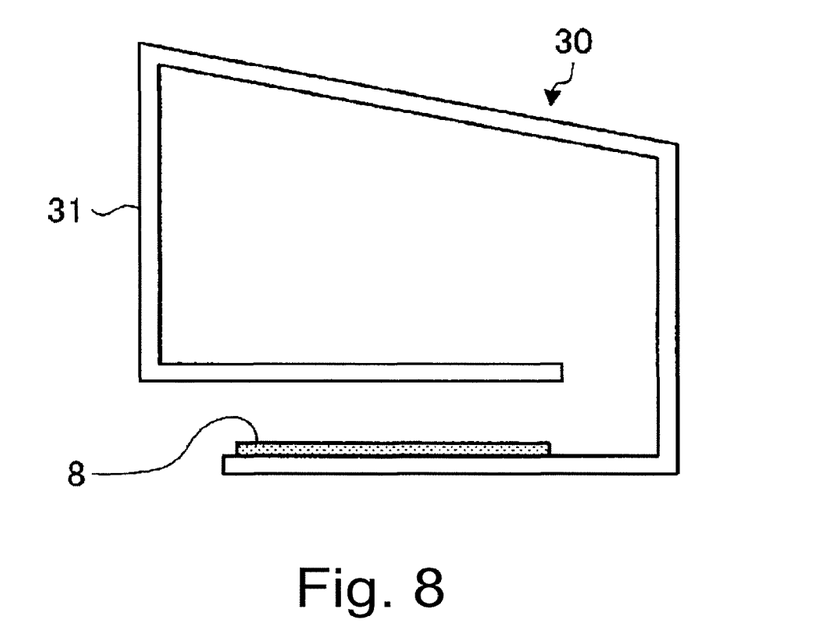
FIG. 8 illustrates an ink layer formed body in accordance with a fourth embodiment.

Subsequently, a method for adhesion in accordance with a fourth embodiment is described with reference to FIG. 8. Meanwhile, in the fourth embodiment, parts different from the first to third embodiments are described so as to avoid the overlapping descriptions, and the same configurations as the first to third embodiments are denoted with the same reference numerals. FIG. 8 illustrates an ink layer formed body of the fourth embodiment.

In the fourth embodiment, an ink layer formed body 30 has a box body 31, which is a base body, and the ink layer 8 formed on the box body 31. A part of the box body 31 is an adherend part, which is an adherend, and a part of the other is an adhesive part, which is an adhesive body. That is, the box body 31 has the adherend and the adhesive body, which are integrated. The ink layer formed body 30 has the ink layer 8, which is formed on the box body 31 by spotting an ultraviolet-curable ink from an inkjet head to the adhesive part of the box body 31, and irradiating ultraviolet ray to the ultraviolet-curable ink and completely curing the same. The ink layer formed body 30 can be easily treated because the ink layer 8 is at a completely cured state before adhesion with the adherend part and does not function as an adhesive. That is, the ink layer formed body 30 can be preserved with the ink layer 8 being completely cured.

Upon assembling of the box body 31, the adherend part and the adhesive part are overlapped with the ink layer 8 being sandwiched therebetween, the ink layer 8 is able to function as an adhesive by heating and melting the ink layer 8 and the adherend part and the adhesive part adhere to each other by the ink layer 8, so that the ink layer formed body 30 is configured.

As described above, according to the fourth embodiment, since the ink layer 8 has been completely cured, it is possible to preserve the box body 31 having the ink layer 8 formed thereon for a long time. Also, upon the assembling of the box body 31, it is possible to enable the ink layer 8 to function as an adhesive by heating the ink layer 8, and to accomplish the favorable bonding between the adherend part and the adhesive part of the box body 31 with the ink layer 8 being interposed therebetween.

Fifth Illustrative Embodiment

Figure 9:
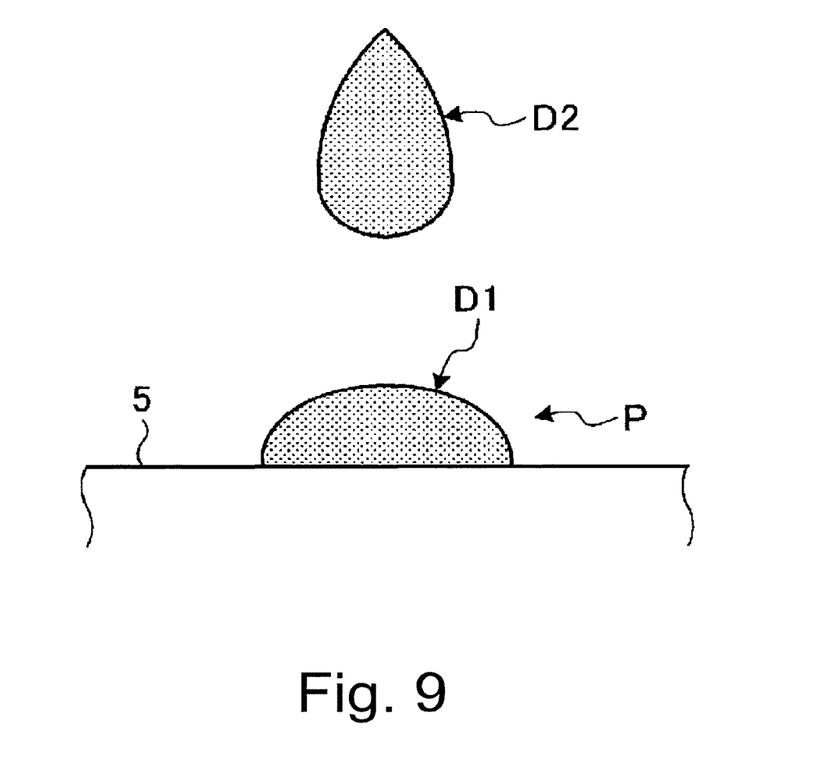
FIG. 9 illustrates an ink layer formation process of a method for adhesion in accordance with a fifth embodiment.

Subsequently, a method for adhesion in accordance with a fifth embodiment is described with reference to FIG. 9.

Meanwhile, also in the fifth embodiment, parts different from the first to fourth embodiments are described so as to avoid the overlapping descriptions, and the same configurations as the first to fourth embodiments are denoted with the same reference numerals. FIG. 9 illustrates an ink layer formation process of the method for adhesion of the fifth embodiment.

According to the method for adhesion of the fifth embodiment, in the ink layer formation process S10 of the first embodiment, the ink layer 8 is formed by performing an overlap printing of overlappingly spotting the ultraviolet-curable ink to the same spotting position P more than once, to which the ultraviolet-curable ink is to be spotted. Also in the ink layer formation process S10 of the fifth embodiment, the printing is performed using "UJF-3042" or "UJF-6042" available from MIMAKI ENGINEERING CO., LTD., for example, as the printing device having the inkjet head 20, and the printing is performed with a resolution of 1200 dpi×1440 dpi by 8-pass. In the meantime, the number of passes is not particularly limited. For example, 4-pass is also possible. When performing the overlap printing in the ink layer formation process S10, an ink amount of the ultraviolet-curable ink that is to be ejected each time is less than a usual case where the overlap printing is not performed (i.e., a case where the ultraviolet-curable ink is to be ejected to the spotting position P only once). Also, in the overlap printing, the ink amount of the ultraviolet-curable ink that is to be ejected each time is the same. Specifically, according to the fifth embodiment, when performing the overlap printing in the ink layer formation process S10, the ultraviolet-curable ink is twice ejected to the same spotting position P. At this time, the ink amount of the ultraviolet-curable ink that is to be ejected at first time and the ink amount of the ultraviolet-curable ink that is to be ejected at second time are the same. Also, the ink amount at first and second times is about 50% of the ink amount that is to be ejected at usual (upon the usual printing). For this reason, in the ink layer formation process S10 of the fifth embodiment, the ultraviolet-curable ink is ejected from the inkjet head 20 to the spotting position P so that the ink amount becomes 100% by performing the overlap printing two times. That is, in the ink layer formation process S10, the ink amount is set to 50% each time, and the printing is repeatedly performed twice with a printing condition based on image data of the ink layer 8 to be formed.

Here, the ultraviolet-curable ink that is to be used in the fifth embodiment is described. As the ultraviolet-curable ink, an ultraviolet-curable ink of which a glass transition temperature Tg is lower than the heating temperature in the bonding process S12 and is equal to or higher than 25° C. is used. In the meantime, the glass transition temperature Tg is 25° C. or higher, preferably 40° C. or higher, and more preferably 60° C. or higher. When the glass transition temperature Tg is lower than the heating temperature, the ink layer 8 is melted and softened by heating the ink layer 8 at the heating temperature in the bonding process S12, so that the softened ink layer 8 functions as an adhesive. At this time, the heating temperature is set to 100° C. to 150° C., for example, 120° C. The heating temperature is appropriately changed depending on the medium 5 to be used. In the meantime, when the glass transition temperature Tg is 25° C. or higher, the ink layer 8 is not softened and is kept with being cured at a state where the ultraviolet-curable ink is under temperature lower than 25° C., for example, under room temperature, so that the ink layer 8 can be suppressed from being softened. Also, when the glass transition temperature Tg is equal to or higher than 40° C., further, 60° C., even though heat is applied to the ink layer 8 from an outside, for example, it is possible to favorably keep the cured state of the ultraviolet-curable ink. For example, when the ink layer is formed on a cover of a portable terminal, even though the ink layer 8 is heated by heat radiation from the portable terminal, the ink layer 8 is not softened and the cured state of the ultraviolet-curable ink is favorably kept, so that the ink layer 8 can be suppressed from being softened. Specifically, as the ultraviolet-curable ink, "LUS-350 Clear" available from MIMAKI ENGINEERING CO., LTD. is used, for example.

As described above, according to the fifth embodiment, the ultraviolet-curable ink is overlappingly ejected from the inkjet head 20 to the same spotting position P more than once, so that it is possible to make a dot diameter of the spotted ultraviolet-curable ink greater, as compared to a configuration where the overlap printing is not performed. Thereby, since it is possible to suppress a pinhole from being formed in the ink layer 8, it is possible to suppress a bonding defect of the foil body 11 that is to adhere to the ink layer 8, so that it is possible to improve a quality of a transferred image of the foil body 11.

Also, according to the fifth embodiment, when performing the overlap printing, the ink amount of the ultraviolet-curable ink that is to be ejected each time is reduced, so that it is possible to form the thin ink layer 8. For this reason, even when a force resulting from scratch or the like is applied to the ink layer 8 via the foil body 11, it is possible to reduce displacement of the ink layer 8, so that it is possible to reduce displacement of the foil body 11 and to thus suppress the foil body 11 from being peeled off. Therefore, it is possible to improve the scratch resistance of the foil body 11.

Also, according to the fifth embodiment, when performing the overlap printing, it is possible to eject the same ink amount of the ultraviolet-curable ink from the inkjet head 20 each time, so that it is not necessary to adjust the ink amount every each ejection.

Also, according to the fifth embodiment, since the glass transition temperature Tg of the ultraviolet-curable ink is lower than the heating temperature, it is possible to favorably soften the ultraviolet-curable ink by the heating in the bonding process S12, so that it is possible to enable the ink layer 8 to appropriately function as an adhesive. Also, since the glass transition temperature Tg of the ultraviolet-curable ink is equal to or higher than 25° C., it is possible to favorably keep the cured state of the ultraviolet-curable ink, so that it is possible to improve the scratch resistance of the foil body 11. In the meantime, the ultraviolet-curable ink of the fifth embodiment may be applied to the other embodiments, too.

Meanwhile, according to the fifth embodiment, in the ink layer formation process S10, the overlap printing is performed twice and each ink amount is set to about 50%. However, the conditions of the overlap printing are not particularly limited. When forming the ink layer 8 with rising from the adherend surface of the medium 5, the number of times of the overlap printing may be increased or each ink amount may be increased. In the meantime, when forming the thinner ink layer 8, the number of times of the overlap printing may be set to three times, and each ink amount may be set to 30% so that the ink amount is to be 90%, for example.

Sixth Illustrative Embodiment

Figure 10:
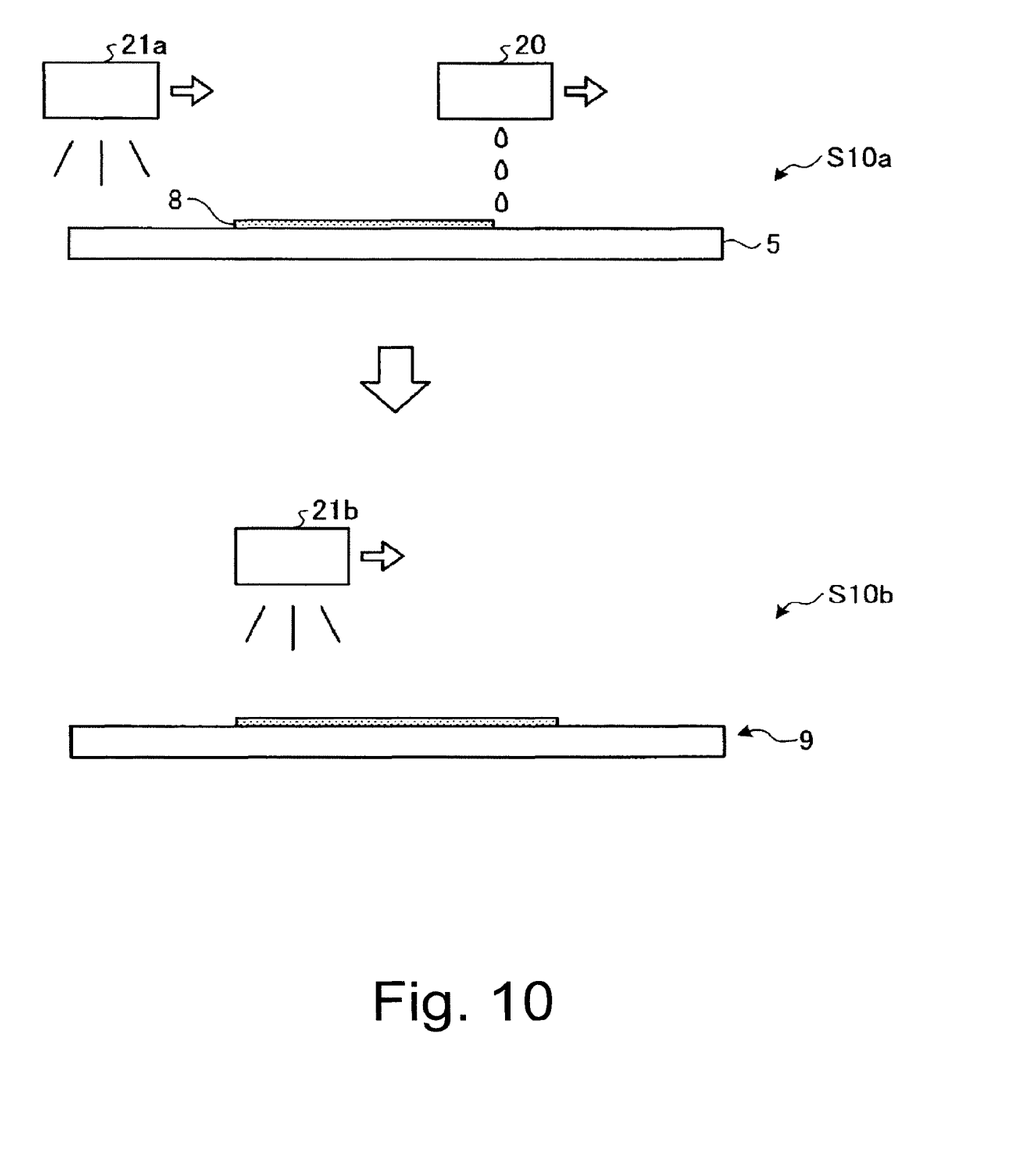
FIG. 10 illustrates an ink layer formation process of a method for adhesion in accordance with a sixth embodiment.

Subsequently, a method for adhesion in accordance with a sixth embodiment is described with reference to FIG. 10.

Meanwhile, also in the sixth embodiment, parts different from the first to fifth embodiments are described so as to avoid the overlapping descriptions, and the same configurations as the first to fifth embodiments are denoted with the same reference numerals. FIG. 10 illustrates an ink layer formation process of the method for adhesion of the sixth embodiment.

According to the method for adhesion of the sixth embodiment, in the ink layer formation process S10 of the first embodiment, the ultraviolet-curable ink is ejected from the inkjet head 20 and is semi-cured (temporarily cured). Thereafter, the ink layer 8 is formed and is then completely cured (main curing). That is, as shown in FIG. 10, the ink layer formation process S10 includes a pre-process S10a of semi-curing the ultraviolet-curable ink and a post-process S10b of completely curing the ink layer 8. The ink layer formation process S10 is also referred to as gloss tone printing.

In the pre-process S10a, the ultraviolet-curable ink is ejected from the inkjet head 20 and the ejected ultraviolet-curable ink is spotted to the medium 5. Also, in the pre-process S10a, the ultraviolet irradiation device 21a is moved, following the moving direction of the inkjet head 20, and the ultraviolet ray is irradiated from an ultraviolet irradiation device 21a to the ultraviolet-curable ink, so that the ultraviolet-curable ink is semi-cured to form the ink layer 8. In this way, in the pre-process S10a, after the ultraviolet-curable ink is ejected, it is semi-cured by irradiating the ultraviolet ray thereto. Therefore, it is possible to suppress the ultraviolet-curable ink from being smudged, so that it is possible to form an image of the inkjet-printed ink layer 8 with high definition. In the meantime, since the ultraviolet-curable ink is at the semi-cured state, an edge portion (a boundary portion between the ultraviolet-curable ink and the spotted medium 5) of the ultraviolet-curable ink spotted to the medium 5 becomes gentle.

Also, in the pre-process S10a, the ultraviolet-curable ink is semi-cured by irradiating the ultraviolet ray thereto with a delay of predetermined time (for example, several seconds) after spotting the ultraviolet-curable ink.

In the post-process S10b, an ultraviolet irradiation device 21b is moved relative to the formed ink layer 8, and the ink layer 8 is completely cured by irradiating the ultraviolet ray to the ultraviolet-curable ink from the ultraviolet irradiation device 21b.

As described above, according to the sixth embodiment, the ultraviolet-curable ink is semi-cured, so that the ultraviolet-curable ink can be suppressed from being smudged. Also, the edge portion of the ultraviolet-curable ink spotted to the medium 5 becomes gentle for the time period after the ultraviolet-curable ink is semi-cured until it is completely cured. For this reason, even when the completely cured ink layer 8 is applied with the force resulting from the scratch via the foil body 11, it is possible to suppress the foil body 11 from being caught on the ink layer 8, so that it is possible to improve the scratch resistance of the foil body 11.

Seventh Illustrative Embodiment

Figure 11:
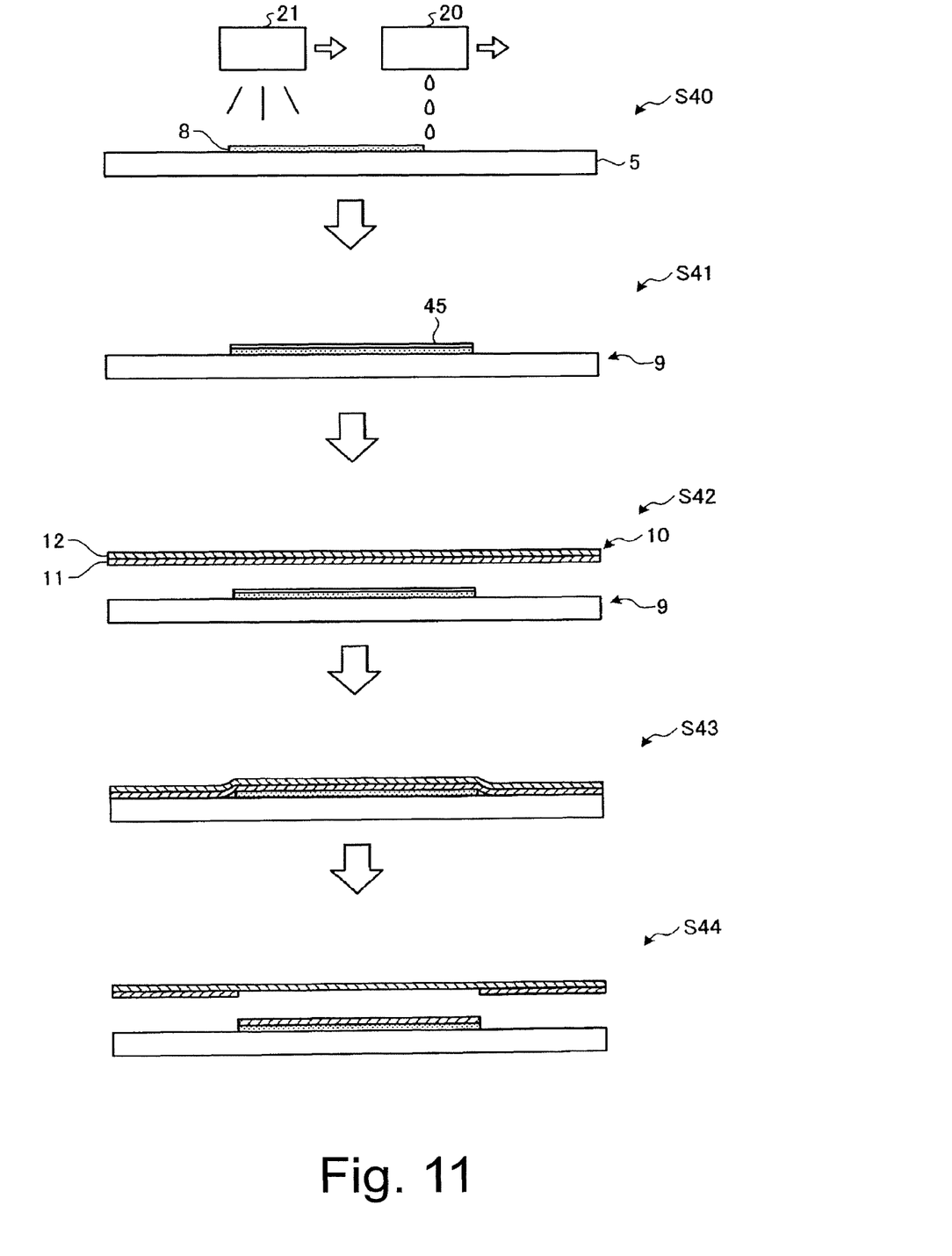
FIG. 11 illustrates a method for adhesion in accordance with a seventh embodiment.

Subsequently, a method for adhesion in accordance with a seventh embodiment is described with reference to FIG. 11. Meanwhile, also in the seventh embodiment, parts different from the first to sixth embodiments are described so as to avoid the overlapping descriptions, and the same configurations as the first to sixth embodiments are denoted with the same reference numerals. FIG. 11 illustrates the method for adhesion of the seventh embodiment.

In the method for adhesion of the first embodiment, the ink layer 8 is softened by heating the ink layer 8, so that the softened ink layer 8 is able to function as an adhesive. In the method for adhesion of the seventh embodiment, the ink layer 8 is dissolved by applying a solvent 45 to the ink layer 8, so that the dissolved ink layer 8 is able to function as an adhesive.

As shown in FIG. 11, in the method for adhesion of the seventh embodiment, an ink layer formation process S40, a solvent applying process S41, a lamination process S42, a bonding process S43 and a release process S44 are sequentially performed.

Since the ink layer formation process S40 is the same as the ink layer formation process S10 of the first embodiment, the descriptions thereof are omitted. In the meantime, also in the ink layer formation process S40 of the seventh embodiment, the printing is performed using "UJF-3042" or "UJF-6042" available from MIMAKI ENGINEERING CO., LTD., for example, as the printing device having the inkjet head 20, and the printing is performed with a resolution of 1200 dpi×1440 dpi by 8-pass. Here, the ultraviolet-curable ink that is to be used in the seventh embodiment is an ink that is to be completely cured by irradiating ultraviolet ray thereto, and is an ink that is to be dissolved by applying the solvent 45 thereto at a completely cured state and is thus to function as an adhesive. The ultraviolet-curable ink includes a thermoplastic resin, and the thermoplastic resin can be dissolved by the solvent 45. As the ultraviolet-curable ink, "LUS-350 Clear" available from MIMAKI ENGINEERING CO., LTD. is used, for example.

In the solvent applying process S41, the solvent 45 is applied to a surface of the ink layer 8 formed on the medium 5. In the solvent applying process S41, when the solvent 45 is applied to the surface of the ink layer 8, a portion of the ink layer 8 applied with the solvent 45 is dissolved, so that the ink layer 8 functions as an adhesive.

Subsequently, in the lamination process S42, the ink layer 8 of the ink layer formed body 9 and the foil body 11 of the vapor-deposited film 10 are overlapped with facing each other, so that the medium 5 and the foil body 11 are laminated with the ink layer 8 being sandwiched therebetween.

In the bonding process S43, the ink layer formed body 9 and the vapor-deposited film 10 are compression-bonded, so that the medium 5 and the foil body 11 are bonded to each other by the ink layer 8. At this time, since it is not necessary to heat the ink layer 8, unlike the other embodiments, the heating member 25 is not used.

Subsequently, in the release process S44, the vapor-deposited film 10 is peeled off from the medium 5. In the vapor-deposited film 10, the foil body 11 bonded to the ink layer 8 is peeled off from the release film 12, and the foil body 11 not bonded to the ink layer 8 is kept with being attached to the release film 12. In this way, the bonded body 1 shown in FIG. 1 is formed by the method for adhesion shown in FIG. 11.

As described above, according to the seventh embodiment, it is possible to cure the ultraviolet-curable ink in the ink layer formation process S40. At this time, since the ultraviolet-curable ink has been cured, it does not function as an adhesive, and the ink layer 8 can be treated as it is cured. For this reason, it is possible to perform the ink layer formation process S10 and the bonding process S12 at a time interval, so that it is possible to increase the convenience of the adhesion operation between the medium 5 and the foil body 11. Also, in the ink layer formation process S10, since it is possible to immediately cure the ink layer 8 by irradiating the ultraviolet ray to the ultraviolet-curable ink, it is possible to suppress the ink layer 8 from being spread and smudged. Also, the ink layer 8 is dissolved by applying the solvent to the ink layer 8, the dissolved ink layer 8 is able to function as an adhesive and the medium 5 and the foil body 11 are laminated with the ink layer 8 being sandwiched therebetween, so that it is possible to favorably bond the medium 5 and the foil body 11. For this reason, it is possible to suppress the ink layer 8, which is to be formed by the ultraviolet-curable ink, from being smudged, so that it is possible to make the foil body 11 bonded to the medium 5 with high definition. Also, since it is not necessary to heat the ink layer 8, it is possible to accomplish the favorable bonding between the medium 5 and the foil body 11 without using the heating member 25.

Meanwhile, in the first to seventh embodiments, a coating film configured to cover the foil body 11 may be additionally formed so as to further improve the scratch resistance. In this case, the coating film may be formed on an entire surface of the medium 5 or the coating film may be formed on a part of the medium 5 to which the foil body 11 is to adhere, which is not particularly limited.

What is claimed is:

1. A method for bonding an adherend to an adhesive body, the method comprising:
   forming an ink layer by spotting an ultraviolet-curable ink, which is ejected from an inkjet head, to any one of the adherend and the adhesive body and irradiating ultraviolet rays to the ultraviolet-curable ink to cure the ultraviolet-curable ink, thereby forming the ink layer;
   applying a solvent to the ink layer and enabling the ink layer to function as an adhesive;
   performing a lamination process by laminating the adherend and the adhesive body with the ink layer being sandwiched between the adherend and the adhesive body, and
   bonding the adherend to the adhesive body.

2. The method according to claim 1, wherein after curing the ultraviolet-curable ink to form the ink layer, and when the ink layer is being applied with the solvent, the ink layer is dissolved and able to function as an adhesive.

3. The method according to claim 1, wherein the ultraviolet-curable ink comprises a thermoplastic resin.

* * * * *